Nov. 15, 1966
C. E. TACK
3,285,197
RESILIENTLY MOUNTED CAR TRUCK BOLSTER
Filed Dec. 5, 1963
3 Sheets-Sheet 1
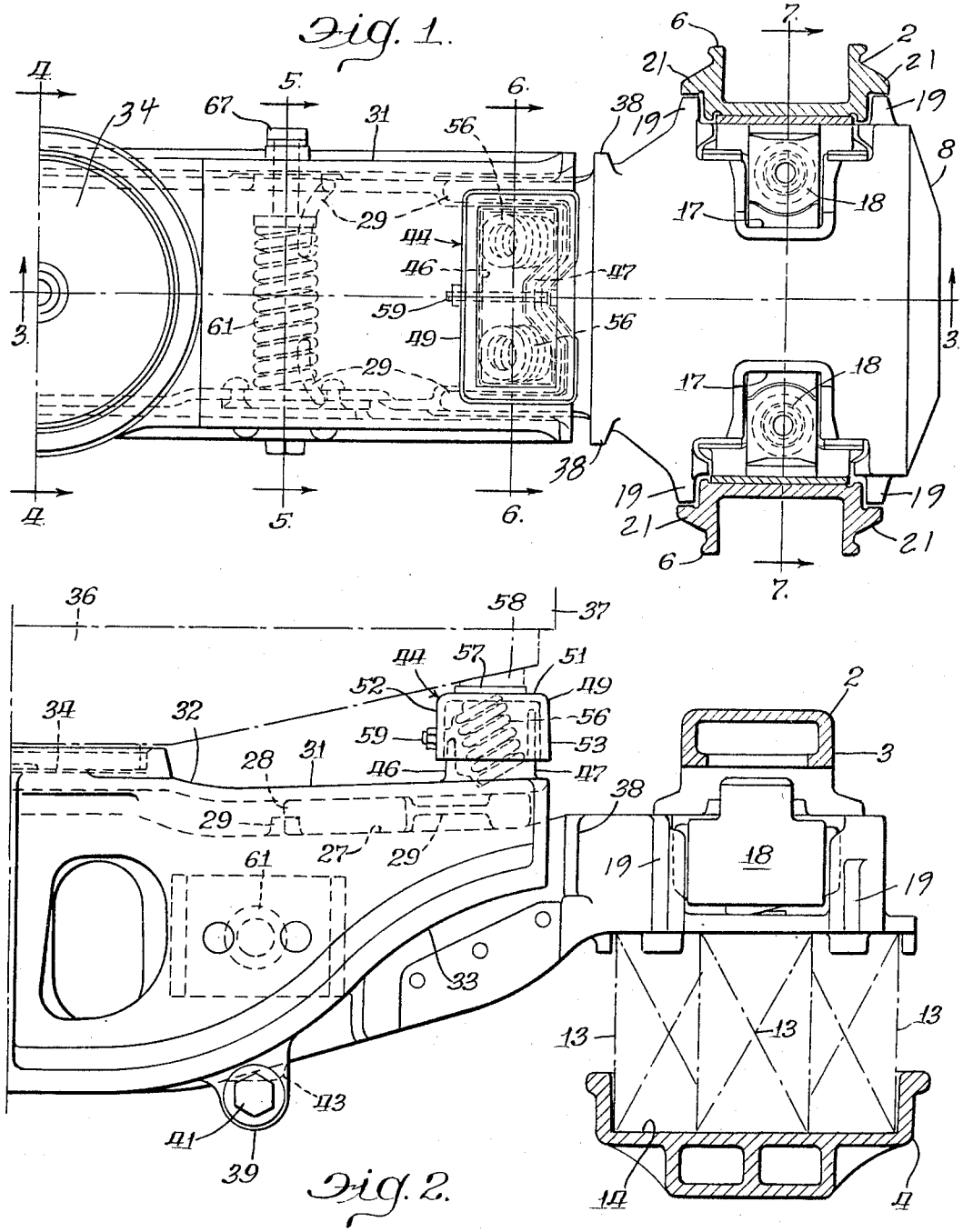
INVENTOR.
Carl E. Tack
BY
Walter F. Schlegel Jr.
Atty.
Witness:
C. Bassett Nov. 15, 1966  C. E. TACK  3,285,197
RESILIENTLY MOUNTED CAR TRUCK BOLSTER
Filed Dec. 5, 1963  3 Sheets-Sheet 2
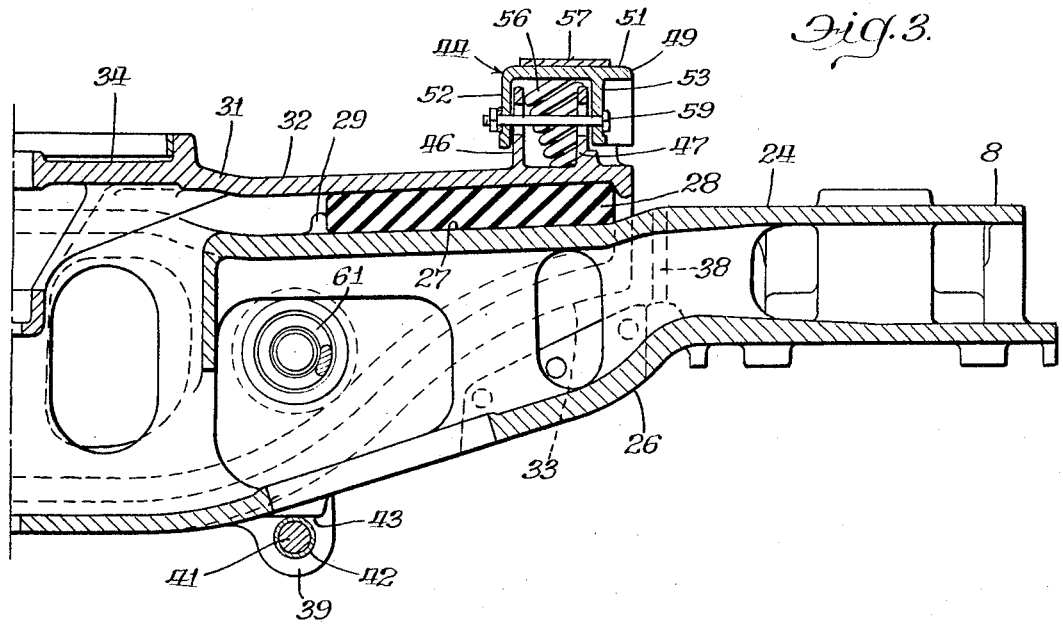
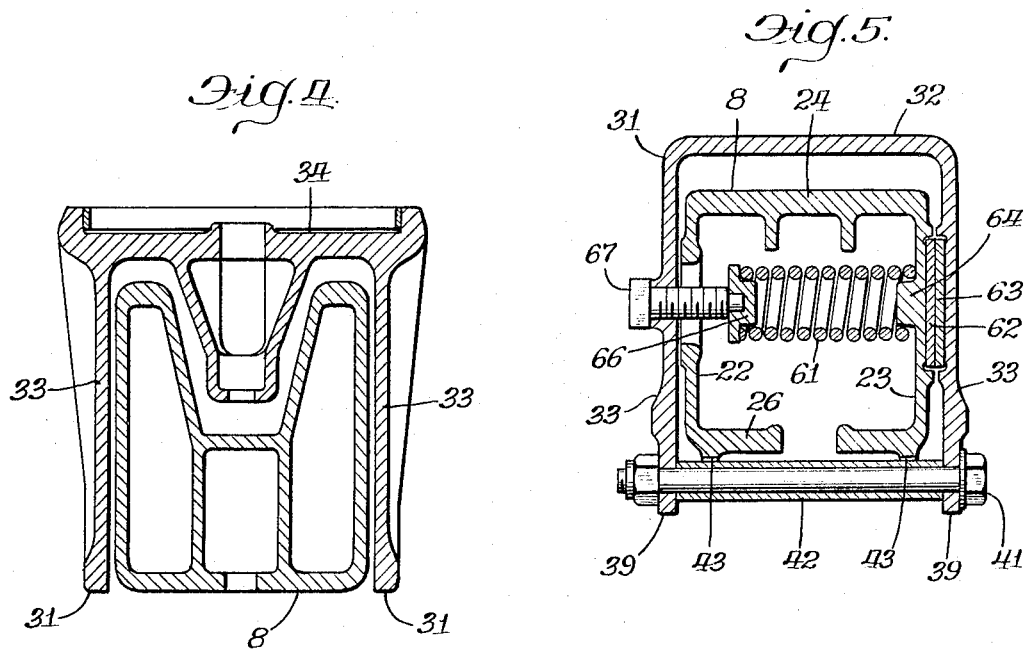
Witness:
C. Bassett
INVENTOR.
Carl E. Tack
BY
Walter L. Schlegel Jr.
Atty.

Nov. 15, 1966  C. E. TACK  3,285,197
RESILIENTLY MOUNTED CAR TRUCK BOLSTER
Filed Dec. 5, 1963  3 Sheets-Sheet 3
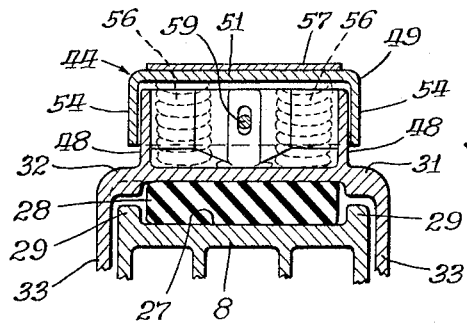
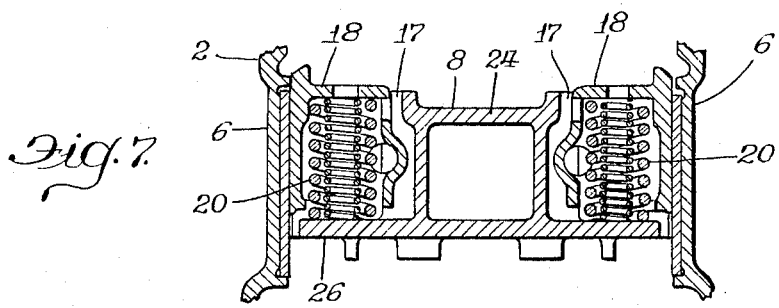
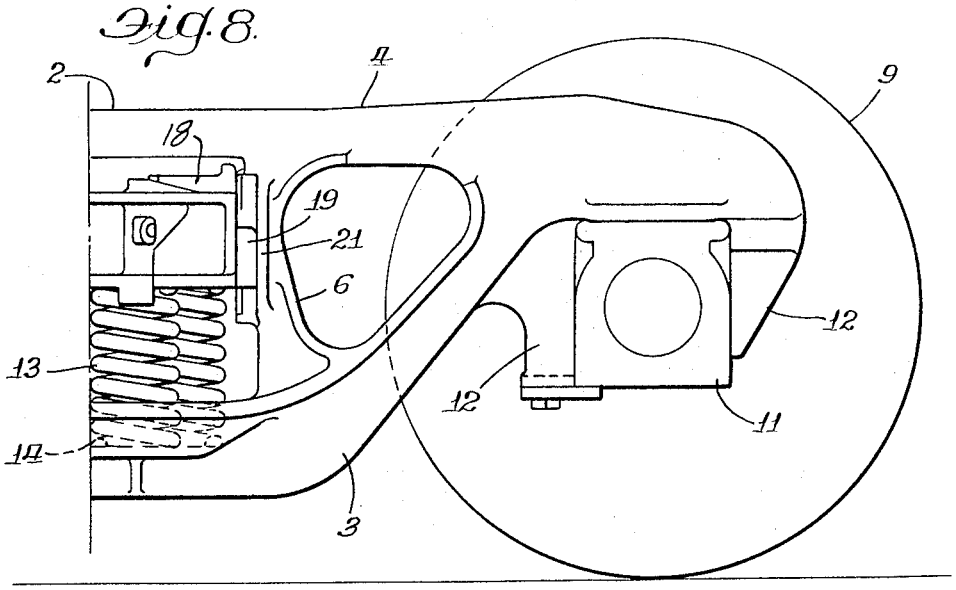
INVENTOR.
Carl E. Tack
BY
Walter L. Schlegel Jr.
Atty.
Witness:
C. Bassett United States Patent Office 3,285,197
Patented Nov. 15, 1966

3,285,197
RESILIENTLY MOUNTED CAR TRUCK BOLSTER
Carl E. Tack, Elmhurst, Ill., assignor to Amsted Industries Incorporated, Chicago, Ill., a corporation of New Jersey
Filed Dec. 5, 1963, Ser. No. 328,408
6 Claims. (Cl. 105—197.2)

This application is a continuation-in-part of my previously filed application, Serial No. 112,274, filed May 24, 1961, now Patent No. 3,141,421, issued July 21, 1964.

This invention relates to railway car trucks and more particularly to a freight car truck adapted to reduce damage to goods resulting from side sway of the car body when the car is traveling at high speeds over rough track.

Briefly, the present invention contemplates the provision of a self-aligning spring plankless freight car truck comprising spaced side frames supported at their ends upon wheel and axle assemblies and interconnected by a truck bolster resiliently supported at its ends upon spring groups seated upon the side frames. An auxiliary bolster, mounted on resilient rubber pads provided on the main bolster, is adapted to move laterally of the truck for a limited distance, said auxiliary bolster being provided with a center plate for pivotal engagement with a body bolster secured to the car body. Friction snubbing means is provided to coact with the rubber pads to control lateral movements of the auxiliary bolster and car body relative to the truck bolster, and side bearings are provided on the auxiliary bolster to slidably engage friction plates on the car body to control swiveling and nosing of the truck. Friction shoes are interposed between the main bolster and side frame columns to control relative movements therebetween.

An object of the invention resides in the provision of a self-aligning spring plankless railway car truck embodying means to control lateral movements of a car body relative to the truck to thereby reduce damage to lading being transported at high speeds over rough track.

Another object of the invention resides in the provision of a self-aligning spring plankless truck embodying an auxiliary bolster mounted upon resilient rubber pads provided on the trock bolster, a car body bolster pivotally connected to the auxiliary bolster, and friction means coacting with the rubber pads to control lateral movements of the auxiliary bolster relative to the truck bolster.

A further object of the invention resides in the provision of side bearings mounted on the auxiliary bolster and engaging the car body to coact with the rubber pads to control swiveling and nosing of the truck.

Another object of the invention resides in the provision of abutment means to limit movements of the auxiliary bolster relative to the truck bolster.

Another object of the invention resides in the provision of friction snubbing shoes and abutment lugs coacting with the side bearings to control and limit rotational movements of the truck bolster relative to the side frames and car body.

The invention embodies other novel features, details of construction and arrangement of parts which are hereinafter set forth in the specification and claims and illustrated in the accompanying drawings, forming part thereof, wherein:

FIGURE 1 is a plan view, partly in section, showing a truck embodying features of the invention, only one-half of the truck being shown as it is symmetrical about its longitudinal center line.

FIGURE 2 is an elevation, partly in section, showing the truck structure illustrated in FIGURE 1.

FIGURE 3 is a section taken along the line 3—3 of FIGURE 1.

FIGURES 4, 5, 6 and 7 are transverse sections taken along the lines 4—4, 5—5, 6—6 and 7—7, respectively, of FIGURE 1.

FIGURE 8 is a side elevation showing the truck, only one-half of the truck being shown as it is symmetrical about its transverse center line.

Referring now to the drawings for a better understanding of the invention, the self-aligning spring plankless railway cars truck is shown as comprising spaced side frames 2, each having tension and compression members 3 and 4 interconnected by spaced columns 6 to define a window adapted to receive one end of a truck bolster 8. Wheel and axle assemblies 9 are journaled in journal boxes 11 mounted between pedestal jaws 12 depending from opposite ends of the side frames 2.

The truck bolster 8 is resiliently supported at its ends upon spring groups 13 mounted upon spring seats 14 provided on the side frame tension members 16. Pockets 17 are formed in opposite sides of the truck bolster adjacent the ends thereof to receive friction shoes 18 biased toward and into frictional engagement against the columns 6 by their respective compression springs 20, as shown and described in United States Patent No. 2,953,-995, granted September 27, 1960, to A. F. Baker, which is incorporated herein by reference.

The truck bolster 8 is provided with guide lugs 19 straddling their respective columns 6 and having their outer ends disposed close to anti-rotation stop ribs 21 extending vertically along the inboard and outboard sides of the columns. The truck bolster is preferably in the form of a one-piece casting having spaced side walls 22 and 23 interconnected by top and bottom walls 24 and 26.

Substantially flat horizontal seats 27 are provided on the top wall 24 of the truck bolster on opposite sides of the center thereof to receive resilient synthetic rubber pads 28 of substantially uniform thickness, each pad being engaged against displacement from its seat by means of lugs 29 which also serve as overtravel stops.

An auxiliary bolster 31 is shown as comprising a top wall 32 and depending side walls 33 straddling the truck bolster 8, the top wall having a circular center plate bearing surface 34 and a pivot pin for pivotal engagement relative to a conventional body bolster 36 secured to a car body 37. The auxiliary bolster is supported adjacent its ends upon the resilient pads 28 for limited movement laterally of the truck, the ends of the bolster being spaced from limit lugs 38 formed on the side walls 22 and 23 of the truck bolster.

The lower ends of the side walls 32 are provided with apertured bosses 39 to receive bolts 41 having spacing collars 42 thereon engaging the inner sides of the side walls. Horizontal abutment surfaces 43 are provided on the lower ends of the bottom wall 26 of the bolster 8 for engagement by their respective collars 42 on the bolts 41 to limit upward movement of the auxiliary bolster 31 relative to the truck bolster.

Side bearings 44 are provided on the outer ends of the auxiliary bolster 31, each bearing comprising inner and outer walls 46 and 47 interconnected by end walls 48, said walls being integral with and projecting upwardly from the top wall 32 of the bolster. A cover 49 comprises a top wall 51 inboard and outboard walls 52 and 53 and end walls 54, which walls enclose the walls 46, 47 and 48.

Two compression springs 56 are mounted on spring seats provided on the top wall 32 and extend upwardly and inwardly to engage the underside of the cover top wall 51 to bias the outboard wall 53 into abutting engagement with the outer wall 47. A friction lining 57 is secured to the cover top wall 32 to engage a body bolster bearing 58. A bolt 59 is provided to limit upward movement of the cover 49 relative to the top wall 32. During vertical movements of the cover 49, the outboard wall 53 is frictionally engaged against the outer wall 47 by the springs 56.

Movements of the auxiliary bolster 31 relative to the truck bolster 8 is controlled by means of compression springs 61 which act to maintain friction plates 62 on the side wall 23 in frictional engagement against friction plates 63 on the adjacent side walls 33. Each spring 61 is engaged between a boss 64 on the side wall 23 and a spring cap 66 mounted on an adjustment screw 67 threaded through the side wall 33 adjacent the side wall 22.

During travel of the railway car rtuck at high speeds over relatively rough track, the truck bolster 8 is resiliently supported upon the spring groups 13, under control of the friction shoes 18. The friction shoes 18 and the anti-rotation lugs 21 coact to maintain the bolster 8 and side frames 2 against an out-of-square condition.

To avoid excessive lateral shock to the lading being supported on the car, the auxiliary bolster 31 is supported for lateral movement on resilient rubber pads 28 provided on the truck bolster 8, the lateral displacement of the auxiliary bolster relative to the truck bolster being limited by the limit lugs 38 formed on the truck bolster for engagement by the ends of the auxiliary bolster. To control lateral movement of the auxiliary bolster, the compression springs 61 act to maintain the plates 62 and 63 in frictional engagement, the pressure exerted by the springs 61 being variable responsive to manual adjustment of the screw 67. Upward and/or tilting movement of the auxiliary bolster 31 is limited by engagement of the spacing sleeves 42 against the horizontal abutment surfaces 43 provided on the truck bolster.

To control nosing or swiveling of the truck, the side bearings 44 are mounted on opposite ends of the auxiliary bolster 31 for engagement against the body bolster bearings 58. The side bearings also act to control lateral sway of the car body.

While the rubber pad seats 27 have been shown and described as being disposed in a common horizontal plane, it is contemplated that the seats 27 may, if desired, be inclined downwardly toward the center of the truck at an angle of, for example, approximately two degrees from a horizontal plane.

I claim:

1. In a self-aligning spring plankless railway car truck having spaced side frames supported at their ends upon wheel and axle assemblies, each side frame comprising tension and compression members interconnected by spaced vertical columns to define windows, spring groups seated on said tension members, a truck bolster interconnecting said side frames and resiliently supported on said spring groups, resilient pads mounted on the bolster, an auxiliary bolster supported adjacent its ends upon said pads for longitudinal and vertical movements relative to the truck bolster, said auxiliary bolster having a top wall and depending side walls straddling the truck bolster and extending therebelow, limit lugs on the truck bolster to engage the ends of and to limit longitudinal movement of the auxiliary bolster relative to the truck bolster, and bolts extending between said side walls below and immediately adjacent said truck bolster to limit upward vertical movement of the auxiliary bolster relative to the truck bolster.

2. A railway car truck according to claim 1 wherein side bearing means is provided on the outer ends of said auxiliary bolster and have movable members for frictional engagement with a car body supported on the car truck, and yielding means is provided for biasing said movable members upwardly into constant engagement with the car body.

3. A railway car truck according to claim 2 wherein said yielding means also biases said movable members inwardly from the ends of the auxiliary bolster.

4. A railway car truck according to claim 3 wherein said bearing means includes a fixed member on the auxiliary bolster, and the movable member is a cover thereover, and the yielding means includes coiled springs inclined upwardly and inwardly, and in their inwardly biasing action maintain said cover in constant frictional engagement with said fixed member.

5. A railway car truck according to claim 4 wherein first snubbing means are provided between the truck bolster and the side frame columns for frictional engagement, means is provided for maintaining said first snubbing means in constant interengagement, second snubbing means are provided between the auxiliary bolster and truck bolster for frictional interengagement, means is provided for maintaining said second snubbing means in constant interengagement, and said auxiliary bolster is provided with a circular center plate bearing surface and a pivot pin extending downwardly from the center plate bearing surface into a cavity provided in the truck bolster.

6. The invention set out in claim 1 wherein said pads are of continuous composition and uniform resilience throughout, the truck bolster is provided with side lugs confining the pads at the sides, and said side lugs act to limit movement of said auxiliary bolster toward the truck bolster.

References Cited by the Examiner

UNITED STATES PATENTS

| | | | |
|---|---|---|---|
| 1,717,045 | 6/1929 | Larsen | 308—138 |
| 1,993,104 | 3/1935 | Lamont | 105—200 |
| 2,009,770 | 7/1935 | Goodwin | 105—193 X |
| 2,348,453 | 5/1944 | Couch | 105—190 |
| 2,492,337 | 12/1949 | Travilla | 105—193 |
| 2,515,853 | 7/1950 | Blattner | 308—138 |
| 2,517,671 | 8/1950 | Jackson | 105—197 |
| 2,721,523 | 10/1955 | McIntosh et al. | 105—197 |
| 2,737,908 | 3/1956 | Williams | 105—197 X |
| 2,754,768 | 7/1956 | Hile | 105—193 |
| 2,907,282 | 10/1959 | Erzer | 105—193 X |

MILTON BUCHLER, *Primary Examiner.*

ARTHUR L. LA POINT, *Examiner.*

H. BELTRAN, *Assistant Examiner.*